United States Patent [19]

Weck

[11] 4,449,549

[45] May 22, 1984

[54] SHUTTER DEVICE FOR AIR CONDUIT OR THE LIKE

[75] Inventor: Franz Weck, Herzogenrath, Fed. Rep. of Germany

[73] Assignee: H. Krantz GmbH & Co., Herzogenrath, Fed. Rep. of Germany

[21] Appl. No.: 464,351

[22] Filed: Feb. 7, 1983

[30] Foreign Application Priority Data

Mar. 19, 1982 [DE] Fed. Rep. of Germany ... 8207890[U]

[51] Int. Cl.³ ...................... F16K 15/03; F16K 15/16
[52] U.S. Cl. .................................. 137/512.1; 137/855; 137/527
[58] Field of Search ...................... 137/512.1, 855, 856, 137/857, 858, 527, 601; 251/299, 298, 300

[56] References Cited

U.S. PATENT DOCUMENTS

| 602,437 | 4/1898 | Ellithorpe | 137/527 |
| 1,438,161 | 12/1922 | Zimmerman | 137/512.1 |
| 4,064,905 | 12/1977 | Nilsson | 137/512.1 |
| 4,304,265 | 12/1981 | Sell | 137/856 |

FOREIGN PATENT DOCUMENTS 179562 5/1966 U.S.S.R. .............................. 251/299

Primary Examiner—Alan Cohan
Assistant Examiner—Mark Malkin
Attorney, Agent, or Firm—Arthur B. Colvin

[57] ABSTRACT

The invention relates to an improved shuttering device for preventing back-flow in air conduits or the like. The device includes an attachment section and a frame section, the latter being provided with a series of elastic lamellae shiftable between blocking and unblocking positions within the frame, the frame having in addition guide plates extending axially of the conduit to prevent transverse currents.

6 Claims, 1 Drawing Figure

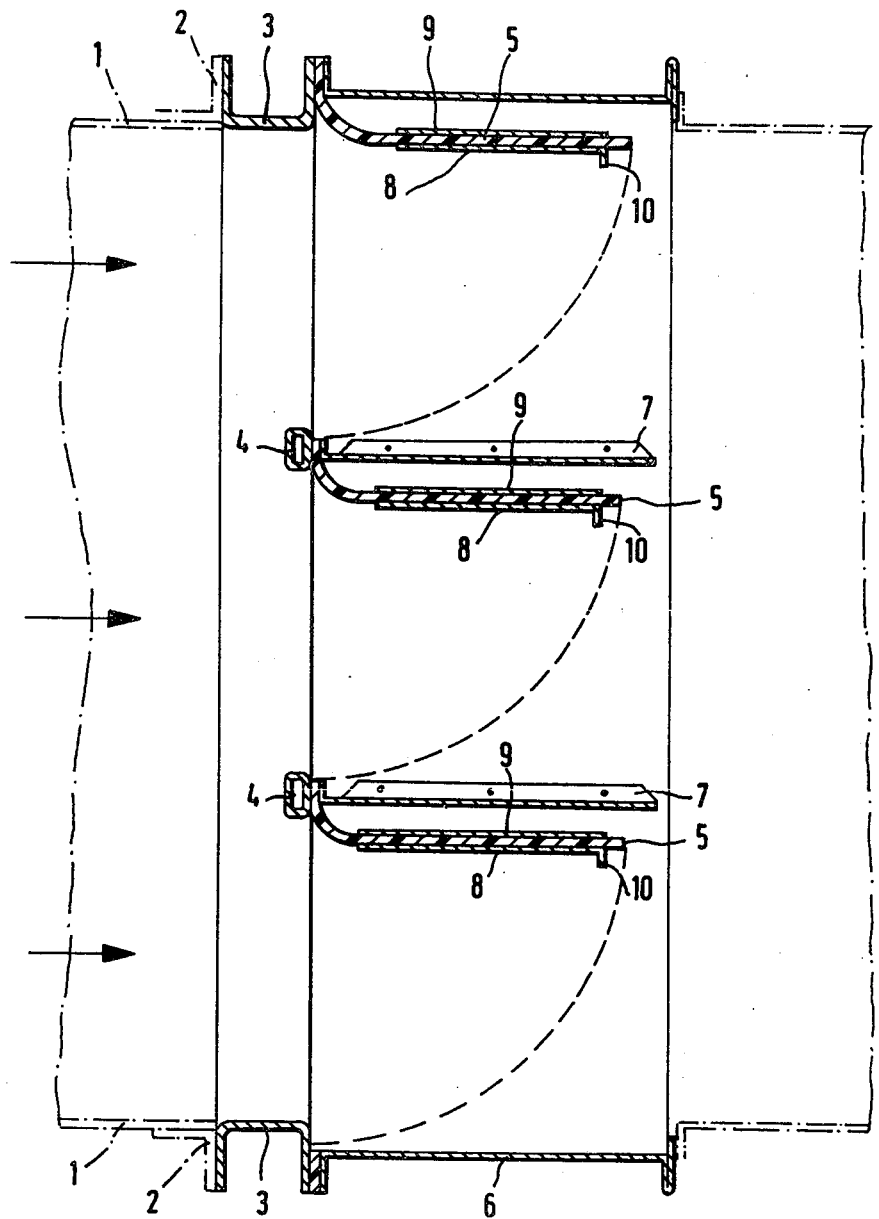

SHUTTER DEVICE FOR AIR CONDUIT OR THE LIKE

This invention concerns a device for shuttering an opening in a conduit or the like and consists of vertically arranged frame forming panels with webs, and of a number of rubber-elastic lamellae identical with the number of panels, which cover each panel, whereby the lamellae are pivotally connected each to an upper longitudinal edge with the frame or webs.

Such devices are installed, e.g. in air pipes of parallel operated fans, or in liquid pipes of parallel working pumps, and serve as stop valves in case one of the fans or pump falls.

The rubber-elastic lamellae used for such a device have the advantage that they make additional sealing means on the opening frame dispensable. A disadvantage, however, is the fact that the elasticity of the lamellae enhances fluttering movements.

In order to avoid the fluttering movements, it is known to reinforce the lamellae surface with a stiffening plate, with the exception of a circumferential marginal strip bearing on the opening edge. Though fluttering movements of a lamellae can be avoided by the stiffening plate, it was found that the lamellae with the stiffening plate still shows a tendency toward swinging.

It has already been suggested, for sealing an opening by an elastic nonreturn flap of rubber or a similar material to prevent the return of a gas or liquid current, to provide above the flap a supporting element, on the underside of which bears the open flap (utility model 72 32 975). In such known device, the supporting element is arranged in an angle of about 45 deg. to the plane of the outlet cross section with the result that the opening position of the flap is correspondingly limited. The advantage of avoiding fluttering movements and oscillations is therefore offset by the disadvantage that the flap clears only about half the line cross-section in its opening position.

The object of the invention is to provide a device of the above described type for shutting off an opening, where neither fluttering movements nor oscillations can appear on the rubber-elastic lamellae and wherein the lamellae are to be brought into an opening position in which the lamellae plane is aligned perpendicularly to the plane of the pipe cross section, so that the lamellae point in the open position parallel to the flow and thus offer the least resistance.

The present invention suggests for the solution of the problem in question to secure on the side of the opening frame equipped with the lamellae a connecting frame whose inside cross section is greater than that of the opening frame, and having webs on which are arranged guide plates aligned perpendicularly to the opening cross section, which plates form panels from the inside cross section of the connecting frame.

In the device according to the invention, the opening frame does not cause any additional blocking of the flow cross section. Since the connecting frame comprising the lamellae has a greater inside cross section than the opening frame, the free cross section in the connecting frame can be fully adapted to that of the opening frame.

The guide plates arranged in the connecting frame have the effect that there is no substantial change in the main direction of flow directly behind the opening frame, that is, in the range of the lamellae when in the open position. Beyond that, the guide plates according to the invention separate the partial volume current through the individual panels without lateral currents. This way fluttering and swinging movements of the lamellae are avoided, because pulse or vertical transmission between the partial air currents to the lamellae is impossible.

The advantages resulting from the device according to the invention are substantially the following:

The principal direction of flow is maintained.

The lamellae rest quietly in the air current because a so-called streaking effect is avoided.

The opening angle of the lamellae attains 90 deg. and is therefore optimal.

The pressure loss of the device is minimal.

The opening position of the lamellae and the dependent pressure losses are not influenced by the shape of the adjoining canal piece.

The safety of the flap is greater.

The risk of damage to the lamellae during shipping and after assembly in a conduit system is lower.

According to one embodiment of the invention, the rubber-elastic lamellae are clamped with their upper longitudinal edges between the opening frame and the connecting frame secured thereon, or between the webs of the opening frame and the guide plates secured thereon, which protrude into the connecting frame.

This type of a fastening makes additional fastening means dispensable, since screw bolts for fastening the connecting frame on the opening frame, for example, or for connecting the webs of the opening frame with the guide plates of the connecting frame can be passed through bores in the upper marginal strip of the lamellae.

According to another embodiment of the invention, the depth of the connecting frame is at least as great as the narrow side of the lamellae.

Due to this design, the lamellae are also in the absolute opening position inside the connecting frame. The depth of the guide plates is preferably 0.6 to 1.5 times the depth of the connecting frame.

According to another embodiment of the invention, each rubber-elastic lamellae is reenforced in a distance from its upper longitudinal edge at least on one side with a bending-resistant plate.

Finally another embodiment of the invention provides that a drift angle or flange aligned with one side perpendicularly to the plane of the lamellae is formed in the lower longitudinal edge of the bending-resistant plate arranged on the side facing the opening frame.

The drift angle or flange according to the invention facilitates the movement of the lamellae from the closing position into the opening position so that a relatively small pulse suffices for the swinging movements of the lamellae into the opening position.

An embodiment of the device according to the invention is shown in a vertical cross section.

Referring now to the drawings, to the end of rectangular conduit 1 there is connected an angle section 2 to which is affixed an opening frame or attachment Section 3 which is likewise rectangular in cross section. A series of horizontally extending webs 4 extend across between the side walls of the attachment section 3 or, optionally across the end of connecting frame 6 adjacent the attachment section 3.

A series of lamellae 5 which are rectangular in plan and comprised of elastomeric material having their upper edges affixed to the webs 4, the uppermost of said lamellae being secured to the upper wall portion of the frame section 6 which may likewise function as and be considered a web 4. It may well be observed that the lamellae are free to pivot due to the flexability of the rubber in a plane normal to the axis of the conduit and frames.

The axial extent of the frame 6 is greater than the swivel range of lamellae 5, and the cross section of frame 6 is greater than that of attachment section 3 and duct or conduit 1.

Guide plates 7 are affixed to webs 4 and extend axially of frame 6, the plates 7 extending the full length of the frame 6.

Preferably, the lamallae are reenforced against bending by bending resistant plates 8, 9 attached to the rearward and forward faces of the lamellae respectively. The cross sectional area of the plates is less than that of the lamellae, leaving a free border or perimeter of rubber surrounding the plates.

The plates 8 may include a flange or drift angle 10 which extends generally perpendicular to the plates. The flange 10 aids in assuring that the lamellae assume a position approaching parallel with the conduit axis during flow periods.

As will be obvious from the above, where there is no flow or a reverse flow in the conduit 1, the lamellae will be normal to the axis of the conduit and block any reverse flow. When there is flow in the conduit, the lamellae will swing to the open position shown in the drawings and will not interfere with flow.

The guide plates 7 block transverse flow, thus preventing chattering.

For ease of construction, the upper edges of the lamellae may be clamped between frames 3 and 6.

From the foregoing it will be seen that there is formed, in accordance with the invention, a simple and effective shuttering device for conduits or the like.

As will be apparent to those skilled in the art, numerous variations in details of construction may be affected in the described embodiment without departing from the spirit of the invention, which is thus to be broadly construed within the scope of the appended claims.

Having thus described the invention and illustrated its use, what is claimed as new and is desired to be secured by Letters Patent is:

1. A chatter resistant shutter device for an air conduit or the like comprising a rectangular attachment section adapted to be mounted to a conduit end, a rectangular frame section affixed to an end of said attachement section, said frame section including side wall portions and upper and lower wall portions, a plurality of mutually spaced apart parallel web members extending between said side wall portions adjacent the interface of said sections, said webs defining therebetween a series of generally rectangular openings, a plurality of generally rectangular elastomeric lamellae in number corresponding to the number of said openings, each said lammelae having an upper edge portion affixed to a said web, said lamellae being shiftable within said frame section responsive to flow in said conduit between a closed position whereat said lamellae are normal to the longitudinal axis of said frame in mutually overlapping position and an open position generally parallel to said axis, and a guide plate member fixed to each said web and extending parallel to said axis.

2. A shutter assembly in accordance with claim 1 wherein the uppermost said web guide plate member is defined by said upper wall portion.

3. A shutter assembly in accordance with claim 1 wherein the axial dimension of said frame exceeds the transverse dimension of said lamellae.

4. A shutter assembly in accordance with claim 3 wherein said lamellae include a rigid plate member affixed to at least one face thereof, said plate members being of smaller area than said lamellae, said lamellae including border portions projecting beyond said plate members.

5. A shutter assembly in accordance with claim 4 wherein said rigid plates are affixed to the surfaces of said lamellae nearest said attachment section, said plates including on the edges nearest the lower surface of said lamellae a flange portion extending at an angle away from said lamellae.

6. A shutter assembly in accordance with claim 1 wherein said upper edges of said lamellae are clamped between said webs and said attachment section.

* * * * *